United States Patent
Palm et al.

(10) Patent No.: US 10,837,482 B2
(45) Date of Patent: Nov. 17, 2020

(54) METHOD FOR ESTABLISHING A CONNECTION

(71) Applicant: SFS intec Holding AG, Heerbrugg (CH)

(72) Inventors: Erich Palm, Au (CH); Oliver Bachmann, Balgach (CH)

(73) Assignee: SFS intec Holding AG, Heerbrugg (CH)

( * ) Notice: Subject to any disclaimer, the term of this patent is extended or adjusted under 35 U.S.C. 154(b) by 153 days.

(21) Appl. No.: 15/736,922

(22) PCT Filed: Jul. 11, 2016

(86) PCT No.: PCT/EP2016/066416
§ 371 (c)(1),
(2) Date: Dec. 15, 2017

(87) PCT Pub. No.: WO2017/009280
PCT Pub. Date: Jan. 19, 2017

(65) Prior Publication Data
US 2018/0172053 A1    Jun. 21, 2018

(30) Foreign Application Priority Data
Jul. 13, 2015  (DE) .................. 10 2015 009 044

(51) Int. Cl.
*F16B 19/10* (2006.01)
*F16B 13/08* (2006.01)
*F16B 43/00* (2006.01)

(52) U.S. Cl.
CPC ...... *F16B 19/1054* (2013.01); *F16B 13/0841* (2013.01); *F16B 43/001* (2013.01)

(58) Field of Classification Search
CPC . F16B 19/1054; F16B 43/001; F16B 13/0841
USPC .............. 29/525.01, 525.02, 525.03, 525.04, 29/525.05, 525.11; 215/358–361; 220/233–238
See application file for complete search history.

(56) References Cited

U.S. PATENT DOCUMENTS 1,065,747 A * 6/1913 Tuck ..................... E21D 21/008
411/70
3,232,162 A * 2/1966 Ketchum .............. F16B 19/008
29/243.522

(Continued)

FOREIGN PATENT DOCUMENTS

DE          19540904        5/1996
DE         102007053136     5/2009

(Continued)

*Primary Examiner* — Sarang Afzali
*Assistant Examiner* — Darrell C Ford
(74) *Attorney, Agent, or Firm* — Volpe Koenig

(57) ABSTRACT

A method for establishing a connection, with the following steps: inserting a sleeve (12) having a stop flange (10) into a bore (14), in such a way that the stop flange (10) is at a distance from a bore edge (16); anchoring at least one elevation (18) of a free end portion (20) of the sleeve (12) in the bore wall (22) by widening the free end portion (20) of the sleeve (12); and moving the stop flange (10) in the direction of the at least one fixed anchored elevation (18) of the free end portion (20) of the sleeve (12), by widening a further portion (24) of the sleeve.

8 Claims, 2 Drawing Sheets

(56) References Cited

U.S. PATENT DOCUMENTS

| | | | | |
|---|---|---|---|---|
| 3,750,822 A | * | 8/1973 | Dubach | B65D 15/14 |
| | | | | 215/361 |
| 3,878,760 A | * | 4/1975 | Jeal | F16B 19/1063 |
| | | | | 411/74 |
| 4,395,174 A | * | 7/1983 | Freeman | F16B 15/06 |
| | | | | 411/387.1 |
| 4,408,938 A | * | 10/1983 | Maguire | F16B 13/126 |
| | | | | 411/181 |
| 4,610,589 A | * | 9/1986 | Bredal | F16B 19/004 |
| | | | | 411/180 |
| 4,629,381 A | * | 12/1986 | Bateman | F16B 5/04 |
| | | | | 411/34 |
| 4,917,552 A | * | 4/1990 | Crawford | F16B 13/126 |
| | | | | 411/32 |
| 4,949,450 A | * | 8/1990 | Scharres | B21J 15/043 |
| | | | | 174/153 R |
| 5,011,337 A | * | 4/1991 | Clark | E21D 21/008 |
| | | | | 405/259.1 |
| 5,352,066 A | * | 10/1994 | Schaeffer | E21D 20/025 |
| | | | | 405/259.4 |
| 5,993,129 A | * | 11/1999 | Sato | F16B 13/124 |
| | | | | 411/43 |
| 6,138,419 A | | 10/2000 | Sekiguchi et al. | |
| 6,926,483 B2 | * | 8/2005 | Hesse | F16B 5/0258 |
| | | | | 411/17 |
| 9,004,304 B2 | * | 4/2015 | Sanders | B65D 39/12 |
| | | | | 215/358 |
| 9,726,213 B2 | * | 8/2017 | Yuzawa | F16B 5/04 |
| 2003/0123949 A1 | * | 7/2003 | Eshraghi | F16B 19/10 |
| | | | | 411/71 |
| 2004/0218990 A1 | * | 11/2004 | Stevenson | F16B 3/005 |
| | | | | 411/82 |
| 2005/0091831 A1 | * | 5/2005 | Murakami | F16B 5/045 |
| | | | | 29/522.1 |
| 2007/0243036 A1 | | 10/2007 | Chen | |
| 2011/0206479 A1 | * | 8/2011 | Sexton | H01J 37/32807 |
| | | | | 411/395 |
| 2012/0007353 A1 | * | 1/2012 | Bunde | F16L 33/2076 |
| | | | | 285/119 |
| 2013/0105474 A1 | * | 5/2013 | Korcz | H01R 13/748 |
| | | | | 220/3.9 |
| 2014/0165369 A1 | * | 6/2014 | Chan | F16B 37/125 |
| | | | | 29/525.11 |
| 2016/0097416 A1 | * | 4/2016 | Cabaj | F16B 13/065 |
| | | | | 411/71 |
| 2019/0249703 A1 | * | 8/2019 | Koontz | F16B 19/1054 |
| 2019/0264722 A1 | * | 8/2019 | Lee | F16B 19/1045 |
| 2019/0271352 A1 | * | 9/2019 | Petty | F23R 3/60 |
| 2019/0383319 A1 | * | 12/2019 | Simpson | F16B 19/1054 |

FOREIGN PATENT DOCUMENTS

| | | |
|---|---|---|
| EP | 0841491 | 5/1998 |
| EP | 1455970 | 12/2010 |

* cited by examiner

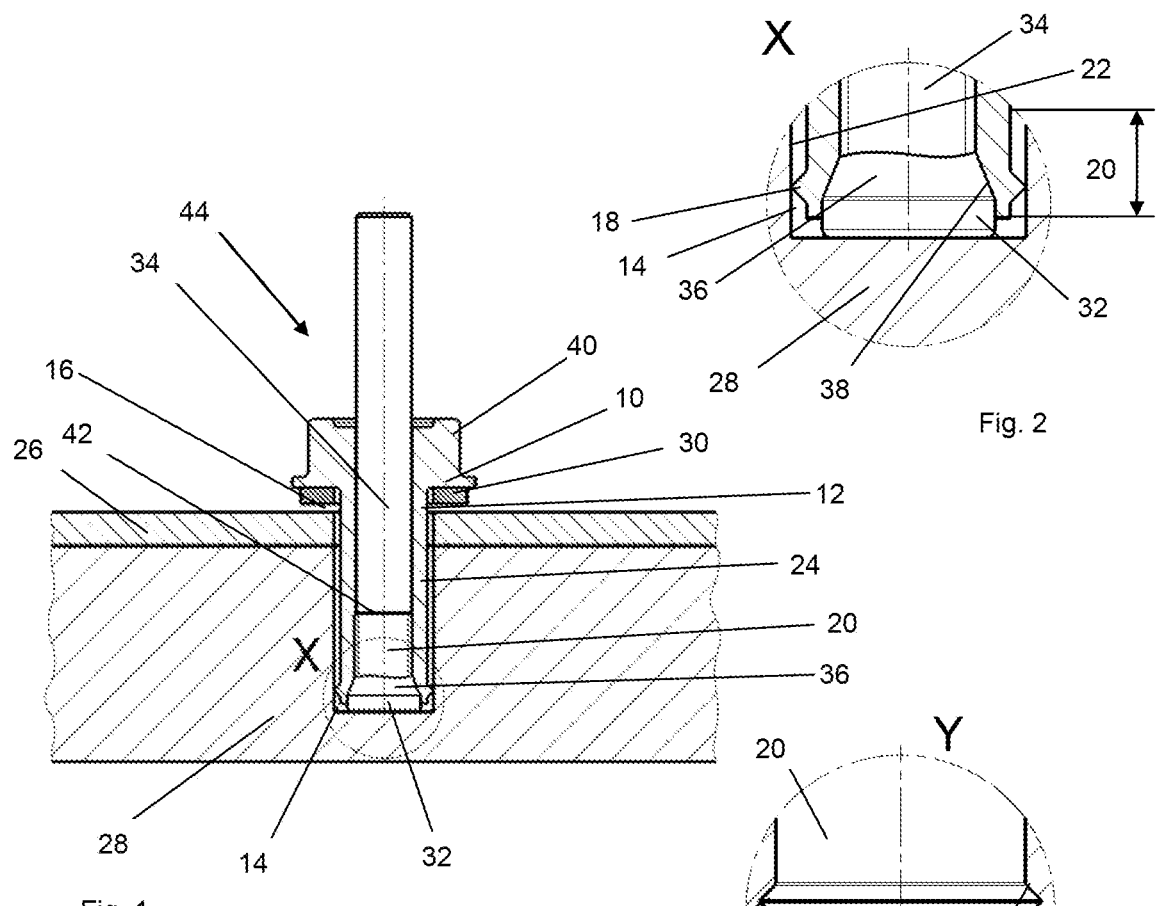
Fig. 2
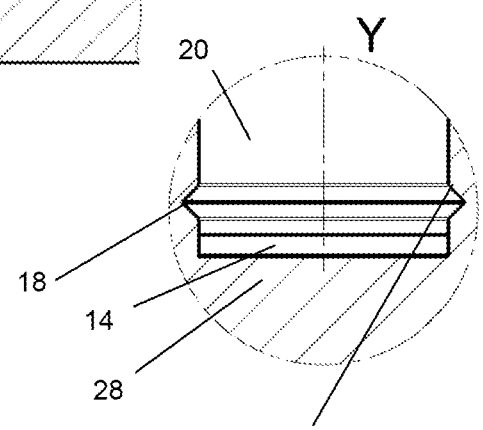
Fig. 4
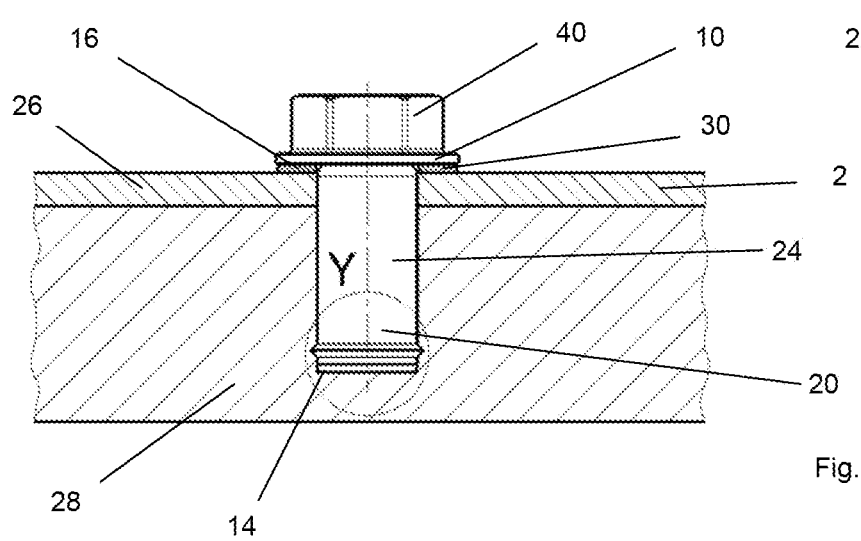
Fig. 1
Fig. 3

METHOD FOR ESTABLISHING A CONNECTION

BACKGROUND

The invention relates to a method for establishing a connection, in particular a connection between a construction component and a construction element, wherein the construction component can in particular be a profile part and the construction element can in particular a cladding panel.

For example, in order to be able to suspend facade panels in the corresponding support structures on the facade, it is necessary to fasten suitable profiles to the facade panels. On the one hand, it is important to provide for straightforward fitting, but on the other hand it is also important to ensure a secure attachment. In the case of facade panels with a thickness from 8 mm, it is usually possible to design the fastening points in the suspended state of the facade panels so that they are not visible due to the fact that no through-bores or holes are provided in the facade panel, but rather blind holes, wherein the blind holes can either be drilled beforehand or otherwise prefabricated.

In this connection, a fastening element inserted into a blind hole for fixing components to construction elements is known from European patent specification EP 0 841 491 B1. The fastening element comprises a circumferentially closed tubular sleeve, which comprises a stop flange and a shaft part constituted with elevations and depressions at the external wall over at least a part of its length. Furthermore, the fastening element comprises a widening mandrel with a traction pin, which extends through a central through-bore of the sleeve. According to the teaching of the patent specification in question, the elevations and depressions on the shaft part of the sleeve are constituted as a thread, the external diameter whereof is equal to or less than the diameter of the blind hole into which the sleeve is inserted. It is regarded as essential and particularly advantageous that the section of the shaft part provided with a thread is guided proceeding from its free end only over a short region, which is less than the depth of the blind hole into which the sleeve is inserted.

Excellent results are achieved with this fastening technique, for example in connection with HPL facade panels (HPL=High Pressure Laminate), because the fitting can take place at a favourable price in a straightforward, quick and reliable manner. The procedure is such that the fastening element is introduced through a through-bore of the profile part (or some other construction component) and into a blind hole of the facade panel (or into a bore of some other construction element), and more precisely such that the stop flange abuts against the profile. The external diameter of the sleeve is then widened with the aid of the widening mandrel to an extent such that the threaded portion is reliably anchored in the construction element. The force exerted in the axial direction by the stop flange on the profile part is in particular dependent on the force that has been exerted on the stop flange in the axial direction during the widening process, for example via a tool, which rests against the stop flange for the withdrawal of the traction pin.

SUMMARY

Against the background of this known prior art, the objective underlying the invention is to specify a method for establishing a connection, without being restricted for example to fastening a profile to a facade panel, with which method the forces acting between the connecting partners after the connection can be predetermined more precisely compared to the prior art, without drawbacks thus arising with regard to the simplicity, the speed and the reliability of the fitting or higher costs.

According to the invention, this objective is achieved by a method for establishing a connection which comprises the following steps:
  insertion of a sleeve comprising a stop flange into a bore, in such a way that the stop flange is at a distance from a bore edge facing the stop flange;
  anchoring of at least one elevation of a free end portion of the sleeve in the bore wall by widening the free end portion of the sleeve;
  movement of the stop flange in the direction of the at least one fixed anchored elevation of the free end portion of the sleeve, by widening a further portion of the sleeve.

Due to the fact that, in this solution, not only the external diameter of the sleeve is enlarged at least in sections, but also the axial length of the sleeve is reduced at the same time, it is possible to predetermine the axial force ultimately exerted directly or indirectly by the stop flange. This has proved to be particularly advantageous, for example, in connection with facade panels made in fibre-reinforced cement or glass fibre-reinforced concrete and profile parts to be fastened thereto, wherein the invention is not of course limited to this use, but can be used anywhere where defined forces between the connecting partners with a low-cost, simple, quick and reliable fitting is important.

As mentioned, the method according to the invention can be used particularly advantageously in cases in which the bore extends through a construction component and into a construction element, for example through a profile part and as a blind hole into a cladding panel. The term "bore" is to be broadly interpreted within the scope of the invention and is not intended only to include holes and/or recesses produced by conventional drilling processes, but also holes or recesses which have been prefabricated in any way. In the case of blind holes, the initial distance of the stop flange from the edge of the bore can be predetermined in a particularly straightforward manner by the total depth of the bore, wherein the total depth of the bore for this purpose must of course be smaller than the distance between the stop flange and the end of the sleeve or between the stop flange and a mandrel possibly extending out of the end of the sleeve.

It is particularly preferable for the invention that the sleeve is a circumferentially closed sleeve, the circumferentially closed state whereof also remains in place during the widening. As a result of maintaining the circumferentially closed state, i.e. the avoidance of any slits in the sleeve, springing-back of regions of the sleeve pushed outwards can be avoided, so that the anchoring forces are well defined and remain in place.

Within the scope of the method according to the invention, provision can be made such that the at least one elevation is an elevation tapering off radially into a tip or a rounded portion. The optimum shape of the elevation can thereby be selected depending on the material from which the respective bore wall is made, wherein it is of course also conceivable to provide a plurality of elevations, which if appropriate can also have a different shape.

Particularly good anchoring results are achieved, for example, if the at least one elevation is at least one circumferential sawtooth-shaped rib or a threaded portion. The provision of a threaded portion is accompanied by the advantage that the connection can be constituted detachably by unscrewing the widened sleeve, which for example will not be the case with a circumferential sawtooth-shaped rib. It should however be clear that any threaded portion used is not provided for adjusting the forces acting between the connecting partners in the manner of a tightening torque, because these forces are determined according to the invention solely by the shortening of the sleeve without rotation of the sleeve.

Very particular advantages result when, within the scope of the method according to the invention, provision is made such that the sleeve is surrounded by a disc-shaped element in the region of the stop flange. This is because the initial distance between the stop flange and the edge of the bore can be fixed by such a disc-shaped element, if the bore has a sufficient total depth and is a through-bore.

In such cases, provision is usually made such that the disc-shaped element is compressible and is compressed when the stop flange is moved in the direction of the at least one fixed anchored elevation of the free end portion of the sleeve. It is particularly preferable that the compression is an elastic compression, because the forces acting between the connecting partners in the axial direction of the sleeve can be predetermined particularly well.

Solutions are regarded nowadays as particularly advantageous wherein provision is made such that the disc-shaped element is compressed by 10 to 90%, preferably by 20 to 80% and particularly preferably by 30 to 70%.

Provision can for example be made such that the disc-shaped element is made of an elastomer, for example chloroprene rubber, natural rubber or ethylene-propylene-diene rubber. Apart from the predetermination of the forces ultimately acting between the connecting partners, these materials can if appropriate also assume a sealing function.

In preferred embodiments of the method according to the invention, provision is made such that the widening of the free end portion and of the further portion of the sleeve takes place with the aid of a mandrel, which is connected to a traction pin which extends through the sleeve and its stop flange. The materials selected for the sleeve, the mandrel and the traction pin are matched to one another such that the desired deformation of the sleeve is adjusted, wherein the mandrel and the traction pin preferably remain at least for the most part un-deformed. The traction pin can if appropriate be provided with a predetermined rupture point, for example in the form of a notch, if provision is made such that at least the mandrel remains a component part of the connection. An increase in the tractive force required in this case for tearing off the traction pin can be achieved for example if the mandrel that brings about the widening comes into the region of the stop flange of the sleeve, wherein the radial widening by the greater material accumulation in this region requires much more tractive force. Solutions are however also conceivable wherein complete pulling out of the mandrel from the sleeve is provided. Thus, for example, a plurality of sleeves can be lined up in the form of a magazine on a single suitably long mandrel and then placed one after the other.

In this connection, it has proved advantageous that the mandrel tapers conically to the diameter of the traction pin, the widening of the sleeve then being facilitated by this measure.

Provision can also be made, if appropriate, such that the conically tapering portion of the mandrel, before the widening of the free end portion of the sleeve, is received at least over a section by an end portion of the sleeve which widens in the form of a funnel. The funnel-shaped widening is preferably made available by a diminishing wall thickness of the sleeve, i.e. without the external diameter of the sleeve being changed in the corresponding end portion before the widening takes place. The arrangement can then be made such that the mandrel does not extend or extends only slightly from the sleeve before the widening of the free end portion. In connection with blind holes, for example, it may be advantageous if, before the widening of the free end portion of the sleeve, the mandrel does not extend at all from this end portion, because then the initial distance between the stop flange and the edge of the bore is fixed exclusively by the blind whole depth and the length of the sleeve.

In all the embodiments of the method according to the invention, provision can be made such that the further portion of the sleeve is adapted during its widening with respect to its external diameter to the internal diameter of the bore. In this way, the sleeve is arranged play-free in the bore at least in the region of the widened portions, so that subsequent tilting of the sleeve can be reliably prevented. Moreover, the anchoring of the at least one elevation in the bore wall is improved by this measure, because evasion space for bore wall material is no longer available.

Furthermore, provision can be made such that the stop flange is designed at least in one portion for the application of a tool. For example, the stop flange can be designed as a screw head or with an internal hexagon at least in the region of its free end portion. This is particularly advisable when the connection is to be a detachable connection, wherein the at least one elevation is constituted thread-like in one way or another.

According to a development of the method according to the invention which was made during the priority year, provision is made such that at least the free end portion of the sleeve comprises an external sleeve part and an internal sleeve part. It is thus possible, for example, to adapt the sleeve to the different bore diameters by the fact that external sleeve parts of differing thickness are used. It is also possible to use different materials for the internal sleeve part and the external sleeve part in order, for example, to adapt the external sleeve part in the optimum manner to the material of the construction element. In addition or alternatively, external sleeve parts with different types/forms of elevation can be used in order to ensure optimum anchoring properties with different construction element materials. For example, a more porous construction element material requires a plurality of elevations and/or ones which extend radially farther outwards than a dense construction element material.

In this connection, it is regarded as particularly advantageous that the external sleeve part and the internal sleeve part are connected in a form-fit manner. Without being restricted to this, threaded connections for example come into consideration in this connection. The external sleeve part is then provided with an internal thread, which cooperates with a corresponding external thread of the internal sleeve part. Bayonet connections or latching connections can however also be used, wherein the latching connections are recommended especially when the external and/or the internal sleeve part is constituted elastic at least in sections.

In addition or alternatively, provision can be made such that the external sleeve part and the internal sleeve part are connected in a friction-locked manner. Clamping connections, in particular, come into consideration as friction-locked connections. The frictional forces can be increased for example by the fact that the contact faces are roughened and/or fluted. If a thread is used, for example as a form-fit connection, and if the latter is to be kept short so that the connection of the external and the internal sleeve part can be established rapidly, it is possible for example to provide a friction-locked connection in the region of the free end portion, which is automatically produced when a form-fit connection takes place by use of a thread provided in the further portion of the sleeve. Conversely, it is of course also possible, for example, to provide the thread only in the region of the free end portion, wherein the friction-locked connection can then takes place in the region of the further portion of the sleeve.

Although it is on no account absolutely essential, it is regarded as advantageous that the region between the free end portion of the sleeve and the stop flange also comprises an external sleeve part and an internal sleeve part. For example, the sleeve can be constituted in two parts from the stop flange and up to the free end portion.

Any sleeve which is suitable for carrying out the method according to the invention is intended to fall within the scope of protection of the associated claims. If such a sleeve already numbers among the prior art, then at least protection for the use of such a sleeve within the scope of the method according to the invention is claimed.

In this connection, any sleeve appears to be particularly suitable that is characterised in that it is circumferentially closed and tubular, that it comprises a stop flange, and that it comprises at least one elevation in the region of a free end portion provided for insertion into a bore, which elevation is provided so as to be anchored in a bore wall when the free end portion is widened.

According to a development of the sleeve according to the invention that took place within the priority year, provision is made such that at least the free end portion of the sleeve comprises an external sleeve part and an internal sleeve p art.

It may be advantageous for the external sleeve part and the internal sleeve part to be connected in a form-fit manner. Reference is made by analogy to the advantages explained above in connection with the method according to the invention.

In addition or alternatively, it is however also possible for the external sleeve part and the internal sleeve part to be connected in a friction-locked manner. In this regard, too, reference is made by analogy to the advantages explained above in connection with the method according to the invention.

With the sleeve according to the invention, provision can also be made such that the region between the free end portion of the sleeve and the stop flange also comprises an external sleeve part and an internal sleeve part.

Any fastening element, comprising such a sleeve and a mandrel provided for widening the sleeve, the mandrel being connected to a traction pin which extends through the sleeve and its stop flange, is also intended to fall within the scope of protection of the present invention.

This applies very particularly to any fastening element, wherein provision is made such that it further comprises a disc-shaped element, which at least in sections surrounds the sleeve in the region of the stop flange. The disc-shaped element can be made from the materials described within the scope of the method according to the invention and can comprise corresponding properties.

Suitable sleeves are characterised, amongst other things, by the fact that their axial length is reduced by 7 to 16% when their external diameter is increased by 18 to 20% by widening. The shortening standardized to the original length can then lie in the range from 10 to 15%, preferably in the range from 12 to 13%.

In the supplied state of the sleeves (i.e. before widening by material deformation), the ratio of the wall thickness to the external diameter can amount to 16 to 20%, preferably 18 to 19%.

With regard to the development of the sleeve according to the invention which took place within the priority year, it is regarded as particularly advantageous to provide a modular system for producing a sleeve, which comprises at least one internal sleeve part and a plurality of external sleeve parts of different materials and/or with differently shaped outer circumferential regions. In practice, such a modular system will of course comprise a multiplicity of internal and external sleeve parts.

With such a modular system, it is possible for example to configure different sleeves directly on the building site and to adapt them for example to different bore diameters by the fact that external sleeve parts of differing thickness are used. Also in this connection, it is possible to use different materials for the internal sleeve part and the external sleeve part, in order for example to adapt the external sleeve part in the optimum manner to the material of the construction element. In addition or alternatively, external sleeve parts with different types/forms of elevation can be used in order to ensure optimum anchoring properties with different construction element materials. For example, a porous construction element material requires, as mentioned, a plurality of elevations and/or ones which extend radially farther outwards than a dense construction element material.

It is essential for the invention that it is based on the widening, the enlargement of the diameter, of the sleeve with simultaneous shortening of the sleeve, wherein the anchoring of the at least one elevation takes place without rotation of the sleeve or any other components.

BRIEF DESCRIPTION OF THE DRAWINGS

An example of embodiment of the invention will be explained below by way of example with the aid of the drawings.

In the figures:

FIG. 1 shows a fastening element in an undeformed state introduced into a blind hole for performing the method according to the invention;

FIG. 2 shows detail X from FIG. 1 in an enlarged representation;

FIG. 3 shows the fastening element from FIG. 1 after performing the method according to the invention;

FIG. 4 shows detail Y from FIG. 3 in an enlarged representation;

DETAILED DESCRIPTION OF THE PREFERRED EMBODIMENTS

Figure 5:
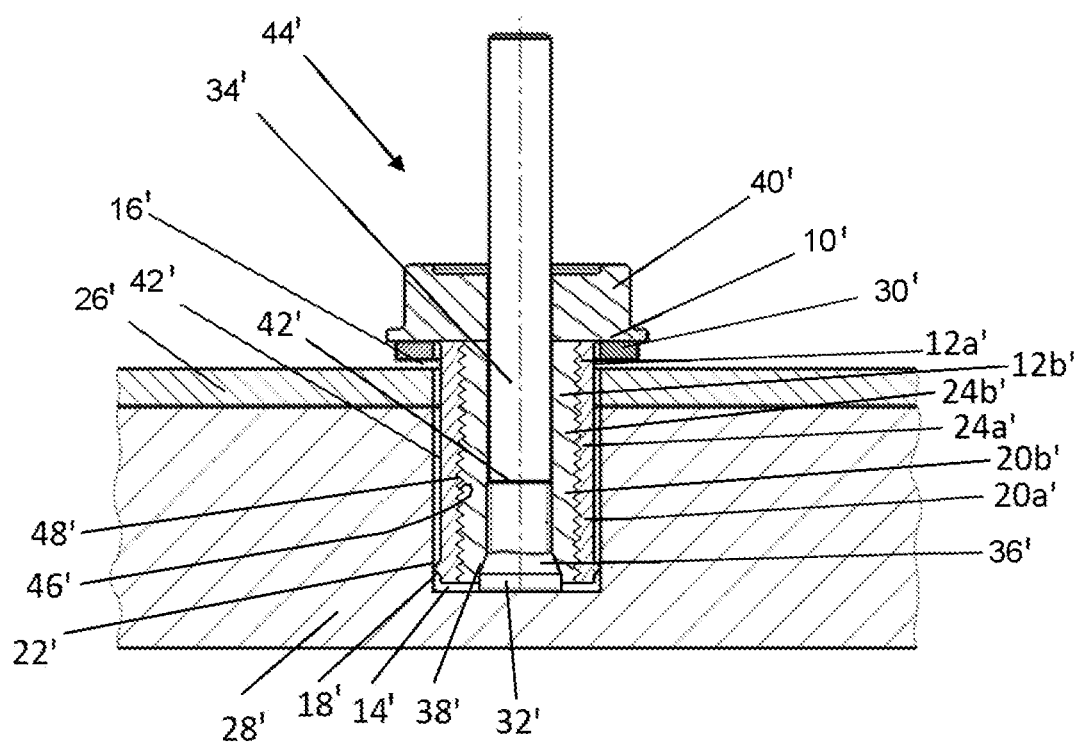
FIG. 5 shows a fastening element in an undeformed state introduced into a blind hole for performing the method according to the invention in an embodiment according to the development of the invention which took place during the priority year.

The same or similar reference numbers denote the same or comparable components in the following description of the drawings. The reference numbers that became necessary due to the development of the invention which took place during the priority year are indicated, i.e. provided with an apostrophe.

Although the method according to the invention can be used for all conceivable types of connection, i.e. for example for fixing various construction components to any construction elements, a particular fastening option will be dealt with in greater detail below, i.e. the fastening of a profile part 26 to a cladding panel 28, in particular a cladding panel made of fibre-reinforced cement or glass fibre-reinforced concrete.

A fastening element denoted as a whole by 44 comprises a sleeve 12, a mandrel 32, which is connected to a traction pin 34 extending through sleeve 12, and a disc-shaped element 30, which surrounds sleeve 12 beneath a stop flange 10. Stop flange 10 comprises in its upper region a portion 40 for applying a tool in the form of a hexagonal screw head, through which a central bore passes, through which bore traction pin 34 extends. Sleeve 10 comprises a free end portion 20, at the outer circumference whereof an elevation 18 in the form of a circumferential rib is provided. This rib could for example also be constituted in a sawtooth form. The outer circumference of sleeve 12 is constant beneath stop flange 10 with the exception of elevation 18. The inner diameter of free end portion 20 of sleeve 12 widens in the form of a funnel, in that the wall thickness of sleeve 12 (except in the region of elevation 18) correspondingly diminishes. Housed in this region of end portion 20 of sleeve 12, which is widened in the form of a funnel, is a portion 36 of mantel 32 which is tapered from the mandrel diameter to the traction pin diameter, in such a way that mandrel 32 extends downwards only slightly out of sleeve 12. In the case represented, traction pin 34 comprises a predetermined rupture point 42 in the form of a notch.

With this fastening element, the method according to invention can be carried out as follows: In the first place, sleeve 12 comprising stop flange 10 is inserted into a bore 14, which extends through profile part 26 and as a blind hole into cladding panel 28. As can be seen from FIG. 1, mandrel 32 sits on the bottom of the blind hole. The length dimensions of mandrel 32 extending out of sleeve 12 and of the portion of sleeve 12 located beneath stop flange 10 are selected such that stop flange 10 is at a distance from bore edge 16 of bore 14. In order to fasten profile 26 to construction element 28, i.e. to establish the connection, a type of rivet pliers is supported on the upper side of portion 40 for applying the tool to stop flange 10, such that a tractive force directed upwards related to the representation can be exerted on traction pin 34. The tool in the manner of rivet pliers can of course be a hydraulically or pneumatically operated device, in particular a device which is suitable for holding a plurality of fastening elements 44 in the manner of a magazine. As a result of a tractive force being exerted on traction pin 34, elevation 18 of free end portion 20 of sleeve 12 is anchored in bore wall 22, because free end portion 20 of sleeve 12 is widened with an upwardly directed movement of mandrel 32. Once free end portion 20 of sleeve 12 has been anchored in bore wall 22, stop flange 10 is moved in the direction of fixed anchored elevation 18 of free end portion 20 of sleeve 12, whereby a further portion 24 of sleeve 12 is widened by a further upwardly directed movement of mandrel 32. This further portion 24 of sleeve 12 extends in the case represented (see FIG. 3) to just beneath stop flange 10. When further portion 24 of sleeve 12 is widened, this portion 24 is adapted with regard to its outer diameter to the inner diameter of bore 14. The effect of the axial shortening of sleeve 12 brought about by the material deformation is that elastically compressible disc-shaped element 30 is compressed between stop flange 10 and the surface of profile 26 in such a way that a predetermined pressing force acts between profile 26 and construction element 28. For this purpose, disc-shaped element 30 can be compressed for example by 30 to 70%.

Although it is not represented, bore 14 can of course also be a through-bore. In this case, the procedure would be such that fastening element 44 would initially be inserted in bore 14 in such a way that disc-shaped element 30 lay loosely in an uncompressed state on profile part 26.

In the case represented (see FIG. 3), the major part of traction pin 34 is removed by predetermined rupture point 42 becoming effective when tapering portion 36 of mandrel 32 reaches the region of stop flange 10, where a deformation of the material exceeds the tractive force limit of predetermined rupture point 42 on account of the greater material thickness. The lower part of traction pin 34 and mandrel 32 remain a component part of the connection with this solution. As mentioned, however, this does not necessarily have to be the case.

FIG. 5 shows a fastening element introduced into a blind hole in an undeformed state for the performance of the method according to the invention in the embodiment according to the development of the invention which took place during the priority year. Only the differences with respect to the embodiment represented in FIGS. 1 to 4 are explained. Otherwise, reference is made to the above description of FIGS. 1 to 4. According to the representation of FIG. 5, the sleeve comprises an external sleeve part 12a' and an internal sleeve part 12b'. The connection between the two sleeve parts 12a' and 12b' takes place in the represented case by means of an internal thread 46' of external sleeve part 12a' and an external thread 48' of internal sleeve part 12b', so that in this case it involves a form-fit connection. According to FIG. 5, internal thread 46' and external thread 48' extend virtually over the entire length of the sleeve, so that there is an internal free end portion 20a' and an external free end portion 20b' as well as an external further portion 24a' and an inner further portion 24b'. This is not however absolutely essential, but on the contrary shorter threads can also be provided. Although it is not represented, connections in the manner of a bayonet connection or latching connections can however also be used, wherein latching connections are recommended especially when the external and/or the internal sleeve part is constituted elastic at least in sections. In addition or alternatively, provision can be made such that the external sleeve part and the internal sleeve part are connected in a friction-locked manner, which however is likewise not represented in FIG. 5. Clamping connections in particular come into consideration as friction-locked connections. The frictional forces can be increased for example by the fact that the contact faces are roughened and/or fluted. If a thread is used for example as a form-fit connection and if the latter is to be kept short so that the connection of the external and the internal sleeve part can be established quickly, this can be done for example by providing in the region of the free end portion a friction-locked connection which is automatically produced when a form-fit connection takes place by means of a thread provided in the further portion of the sleeve. Conversely, as mentioned, it is of course also possible to provide the thread only in the region of the free end portion, wherein the friction-locked connection can then take place in the region of the further portion of the sleeve.

The two-part embodiment of sleeve 12a', 12b' has the advantage that it is for example possible to adapt to sleeves 12a', 12b' to different bore diameters by the fact that external sleeve parts 12a' of differing thickness are used. It is also possible to use different materials for inner sleeve part 12b' and external sleeve part 12a', in order for example to adapt external sleeve part 12a' in the optimum manner to the material of construction element 28'. In addition or alternatively, external sleeve parts 12a' with different types/forms of elevations 18' can be used, in order to ensure optimum anchoring properties with different construction element materials. For example, a porous construction element material requires a plurality of elevations 18' and/or ones which extend radially farther outwards than a dense construction element material. In the case represented in FIG. 5, elevation 18' of external sleeve part 12a' is constituted as a circumferential rib.

The features of the invention disclosed in the above description, in the drawings and in the claims can be essential for the performance of the invention both individually and also in any combination.

LIST OF REFERENCE NUMBERS 10, 10' stop flange
12 sleeve
12a' external sleeve part
12b' internal sleeve part
14, 14' bore
16, 16' bore edge
18, 18' elevation
20 free end portion of the sleeve
20a' external free end portion of the sleeve
20b' internal free end portion of the sleeve
22, 22' bore wall
24 further portion of the sleeve
24a' external further portion of the sleeve
24b' internal further portion of the sleeve
26, 26' construction component/profile part
28, 28' construction element/cladding panel
30, 30' disc-shaped element
32, 32' mandrel
34, 34' traction pin
36, 36' tapering portion of the mandrel
38, 38' end portion of the sleeve widened in the form of a funnel
40, 40' portion of the stop flange for a tool application
42, 42' predetermined rupture point of the traction pin
44, 44' fastening element
46' internal thread of the external sleeve part
48' external thread of the internal sleeve part

The invention claimed is:

1. A method for establishing a connection which comprises the following steps:
providing a sleeve that is circumferentially closed and having a stop flange at one end and having a mandrel at a tip end thereof;
inserting the sleeve into a blind bore that is located in parts to be connected, the sleeve being inserted such that the stop flange is at an axial distance from a bore edge at a top end of the blind bore facing the stop flange due to the mandrel contacting a bottom of the blind bore;
anchoring of at least one elevation of a free end portion of the sleeve in the bore wall by widening the free end portion of the sleeve;
moving the stop flange in a direction of the now anchored at least one elevation of the free end portion of the sleeve by widening a further portion of the sleeve; and
maintaining a circumferentially closed state of the sleeve during the widening; wherein
the at least one elevation is at least one circumferential sawtooth-shaped rib or a threaded portion.

2. The method according to claim 1, wherein the bore extends through a construction component and into a construction element.

3. The method according to claim 1, wherein the widening of the free end portion and of the further portion of the sleeve takes place using the mandrel, which is connected to a traction pin which extends through the sleeve and the stop flange, and tapers conically to a diameter of the traction pin.

4. The method according to claim 1, wherein when the further portion of the sleeve is widened, an outer diameter of the further portion is adapted to an inner diameter of the bore.

5. The method according to claim 1, further comprising applying a tool to at least a portion of the stop flange.

6. The method according to claim 1, wherein at least the free end portion of the sleeve comprises an external sleeve part and an internal sleeve part, which are connected in a form-fit manner or in a friction-locked manner.

7. The method according to claim 6, wherein a region between the free end portion of the sleeve and the stop flange also comprises the external sleeve part and the internal sleeve part.

8. The method according to claim 1, wherein an axial length of the sleeve is reduced by 7% to 16% when as an external diameter is increased by 18% to 20% by the widening.

* * * * *